Patented July 12, 1938

2,123,217

UNITED STATES PATENT OFFICE 2,123,217

PROCESS FOR THE PRODUCTION OF HORMONES

Everett S. Wallis and Willis A. Yarnall, Princeton, N. J., assignors to Merck & Co. Inc., Rahway, N. J., a corporation of New Jersey No Drawing. Application July 15, 1937, Serial No. 153,866

7 Claims. (Cl. 260—131)

The invention relates to improved processes for producing a mixture of ketones comprising $\Delta^5$-pregnenolone and its isomer, $\Delta^5$-isopregnenolone.

The compound $\Delta^5$-pregnenolone which is an important intermediate in the synthesis of the corpus luteum hormone, $\Delta^4$-pregnendione, has been prepared previously from stigmasterol by rather involved and complicated process.

We have now found an improved process whereby a mixture of the two ketones, $\Delta^5$-pregnenolone and its isomer $\Delta^5$-isopregnenolone is obtained from the male sex hormone dehydroandrosterone which may be derived directly from cholesterol, thus making possible the production of $\Delta^5$-pregnenolone, and, hence the corpus luteum hormone, from the easily obtainable cholesterol, according to the following scheme:

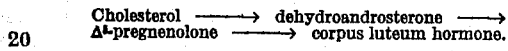
Cholesterol ⟶ dehydroandrosterone ⟶
$\Delta^5$-pregnenolone ⟶ corpus luteum hormone.

The first step of our new process comprises the condensation of dehydroandrosterone with ethyl-$\alpha$-chloropropionate in the presence of an alkali metal alcoholate, such as sodium ethylate.

The course of this reaction may be represented as follows:

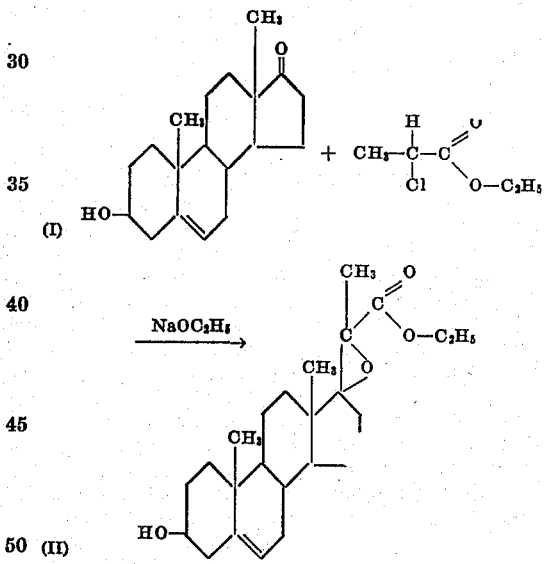

The ester oxide (II) thus obtained is then hydrolyzed and yields, together with an acid which forms an insoluble sodium salt, a mixture of ketones, which has the properties of $\Delta^5$-pregnenolone and its isomer $\Delta^5$-isopregnenolone, of the respective formulae:— and

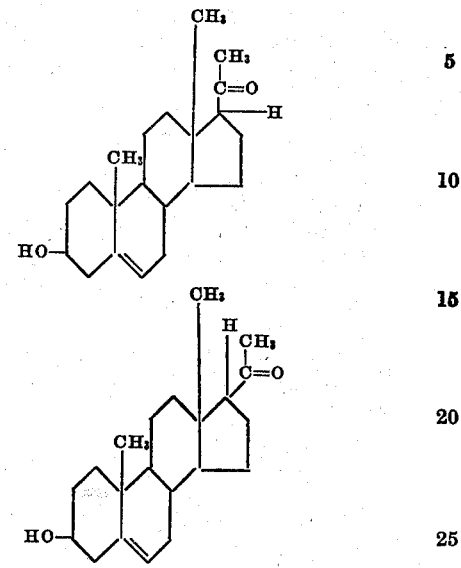

During the condensation of the dehydroandrosterone and ethyl-$\alpha$-chloropropionate, it has been found that some androstendiol-(3,17) is formed by the reducing action of the sodium ethylate.

In the following examples, the complete details of our process for the production of the ketone mixture $\Delta^5$-pregnenolone and $\Delta^5$-isopregnenolone are given. It will be understood, of course, that these steps may be varied somewhat as to their order and the specific reagents employed, without departing from the spirit and scope of our invention.

Examples

I. To a cooled solution of about 0.71 gms. of dehydroandrosterone in about 90 cc. of dry ether is added a large excess of ethyl-$\alpha$-chloropropionate (about 0.92 cc.) and powdered sodium ethylate (amount formed from 0.45 gms. of sodium). The mixture is refluxed for about 56 hours. Water and ether are then added to the reaction mixture and the ether layer is washed free of alkali, dried and evaporated. The residue is taken up in alcohol and treated with about 0.5 gms. of semi-carbazide hydrochloride and about 1 gm. of sodium acetate, to remove any unchanged dehydroandrosterone. A small amount of semi-carbazone is thus obtained.

The ether solution is dried over $Na_2SO_4$, evaporated to dryness, taken up in alcohol and 2N sodium hydroxide, and refluxed for two hours. The alcohol is partially evaporated, and the residue treated with ether and extracted with a 2N sodium hydroxide solution. An insoluble sodium salt is thus formed. The ether layer is again dried with $Na_2SO_4$, evaporated to dryness, taken up in alcohol and treated with semicarbazide hydrochloride and sodium acetate. A semi-carbazone having a melting point of about 215–223° is obtained. The neutral material from the ether layer which does not form a semi-carbazone is sublimed in high vacuum at 140–150°. The sublimate is crystallized from acetone; it melts at about 172°. Recrystallization gives a product which melts at about 174°, and when mixed with a specimen of androstendiol (3,17) shows no depression in melting point.

The semi-carbazone of melting point 215–223° is treated with alcohol, and 5N sulfuric acid for one and a half hours. The reaction mixture is worked up and the ketones sublimed in high vacuum at about 118°–120°; the resulting crystalline product, comprising a mixture of the ketones $\Delta^5$-pregnenolone and $\Delta^5$-isopregnenolone, melts at about 153–159°.

II. To a cooled solution of about 0.40 gm. of dehydroandrosterone in about 25 cc. of carefully dried ether there is added about 0.19 cc. of ethyl-α-chloropropionate and 0.10 gm. of finely powdered sodium ethylate. The mixture is shaken at room temperature in a 50 cc. glass stoppered flask for about 72 hours and then refluxed for about 24 hours. Ether and water are added and the solution is extracted with soda solution. The ether layer is dried over sodium sulfate and evaporated to dryness. The residue is subjected to high vacuum for about one hour at room temperature to remove any ethyl-α-chloropropionate or α-ethoxypropionate which might be present. The residue is treated with alcohol, sodium acetate and semicarbazide hydrochloride to remove any unchanged dehydroandrosterone.

The ether solution from the semicarbazone is washed with soda solution, dried over sodium sulfate, and evaporated to dryness. The residue is hydrolyzed by taking it up in alcohol and treating it with an alcoholic solution of sodium ethylate. It is refluxed in a water bath for about ½ to ¾ hour. Ether and water are added to the solution. The ether layer is dried, evaporated, and again treated with ether to remove small amounts of insoluble semicarbazone. The ether filtrate is evaporated, and the partially crystallized residue is treated with acetic anhydride and refluxed for about one and one-half hours in order to convert the hydroxyketones into the corresponding acetates.

The excess acetic anhydride is removed and the ether layer dried and evaporated. The residue is dissolved in alcohol and treated with sodium acetate and semicarbazide hydrochloride. A semicarbazone acetate having a melting point of about 240–244° is obtained.

The semicarbazone acetate is hydrolyzed and gives a mixture of ketones which sublime at 115–120°, under high vacuum. The ether layer is evaporated and a small amount of androstendiol (3,17) diacetate crystallizes. When recrystallized it has a melting point of about 158°.

We claim as our invention:

1. In a process for the production of substances having the properties of $\Delta^5$-pregnenolone, and $\Delta^5$-isopregnenolone, the step which comprises condensing dehydroandrosterone with ethyl-α-chloropropionate, in the presence of an alkali metal alcoholate.

2. In a process for the production of substances having the properties of $\Delta^5$-pregnenolone and $\Delta^5$-isopregnenolone the step which comprises condensing dehydroandrosterone with ethyl-α-chloropropionate in the presence of sodium ethylate.

3. In a process for the production of substances having the properties of $\Delta^5$-pregnenolone and $\Delta^5$-isopregnenolone the steps which comprise condensing dehydroandrosterone with ethyl-α-chloropropionate in the presence of an alkali metal alcoholate, and hydrolyzing the ester oxide thus obtained.

4. A process for the production of substances having the properties of $\Delta^5$-pregnenolone and $\Delta^5$-isopregnenolone which comprises condensing dehydroandrosterone with ethyl-α-chloropropionate in the presence of an alkali metal alcoholate, hydrolyzing the ester oxide thus obtained, and separating the mixture of physiologically active ketones from the acid simultaneously produced during hydrolysis.

5. A process for the production of substances having the properties of $\Delta^5$-pregnenolone and $\Delta^5$-isopregnenolone which comprises condensing dehydroandrosterone with ethyl-α-chloropropionate in the presence of an alkali metal alcoholate, hydrolyzing the ester oxide thus obtained to simultaneously produce an acid and a mixture of physiologically active ketones, and separating out the acid in the form of its insoluble sodium salt.

6. A process for the production of substances having the properties of $\Delta^5$-pregnenolone and $\Delta^5$-isopregnenolone which comprises condensing dehydroandrosterone with ethyl-α-chloroproprionate, in the presence of an alkali metal alcoholate, adding water and ether, washing the ether layer free of alkali, drying and evaporating, removing unchanged dehydroandrosterone by treatment with semicarbazide hydrochloride, separating out the acid produced in the form of its insoluble sodium salt, converting the residue to the corresponding semi-carbazone, treating the semicarbazone with alcohol and 5N sulfuric acid, working up the reaction mixture and subliming the ketones obtained in high vacuum at about 118–120°.

7. A process for the production of substances having the properties of $\Delta^5$-pregnenolone and $\Delta^5$-isopregnenolone which comprises condensing dehydroandrosterone with ethyl-α-chloropropionate in the presence of an alkali metal alcoholate, removing unchanged dehydroandrosterone by treatment with semicarbazide hydrochloride, washing the ether solution from the semicarbazone with alkali solution, drying, hydrolyzing the residue, adding ether and water, drying the ether layer, treating the partially crystallized residue with acetic anhydride and refluxing to convert the hydroxyketones present into the corresponding acetates, treating the semicarbazide hydrochloride, and hydrolyzing the semicarbazone acetate to obtain the physiologically active ketone mixture.

EVERETT S. WALLIS.
WILLIS A. YARNALL.